(12) United States Patent
Kimener

(10) Patent No.: US 7,753,188 B2
(45) Date of Patent: Jul. 13, 2010

(54) PALLET LOCKS

(76) Inventor: Tom Kimener, 112 Northeast Dr., Loveland, OH (US) 45150

( * ) Notice: Subject to any disclaimer, the term of this patent is extended or adjusted under 35 U.S.C. 154(b) by 411 days.

(21) Appl. No.: 11/891,225

(22) Filed: Aug. 9, 2007

(65) Prior Publication Data
US 2008/0035032 A1 Feb. 14, 2008

Related U.S. Application Data

(60) Provisional application No. 60/836,528, filed on Aug. 9, 2006.

(51) Int. Cl.
*B65G 1/08* (2006.01)
(52) U.S. Cl. ...................... 193/32; 193/35 A
(58) Field of Classification Search .............. 198/530; 193/32, 35 A
See application file for complete search history.

(56) References Cited

U.S. PATENT DOCUMENTS

| | | | | |
|---|---|---|---|---|
| 1,425,599 A | * | 8/1922 | Lister | 193/35 A |
| 3,058,564 A | * | 10/1962 | Kubat | 193/35 A |
| 3,990,557 A | * | 11/1976 | Carder | 193/35 A |
| 4,646,909 A | * | 3/1987 | vom Stein | 198/460.1 |
| 5,141,382 A | | 8/1992 | Naumanen | |
| 5,213,189 A | * | 5/1993 | Agnoff | 193/35 A |
| 5,375,689 A | * | 12/1994 | Sapp et al. | 193/35 A |
| 5,934,438 A | * | 8/1999 | Hilerich, Jr. | 193/35 A |
| 6,119,843 A | * | 9/2000 | Robinson | 193/35 A |
| 6,202,821 B1 | | 3/2001 | Crockett | |
| 6,220,418 B1 | * | 4/2001 | Moradians | 193/35 A |
| 6,223,875 B1 | * | 5/2001 | Malow | 193/35 A |
| 6,763,930 B2 | * | 7/2004 | Johnson et al. | 198/459.6 |
| 7,111,721 B1 | * | 9/2006 | Turner | 198/345.3 |
| 2007/0267271 A1 | * | 11/2007 | Brown | 193/37 |

FOREIGN PATENT DOCUMENTS

| | | | | |
|---|---|---|---|---|
| DE | 4200641 A1 | * | 7/1993 | 193/35 A |
| EP | 398349 A2 | * | 11/1990 | 193/35 A |

* cited by examiner

*Primary Examiner*—Mark A Deuble

(57) ABSTRACT

A pallet lock comprising: (a) a housing including two opposing rails defining a channel therebetween; and (b) a biased double lock at least partially seated within the channel, the double lock repositionable between a pick side blocking position and a load side blocking position, the double lock including a load side portion and an opposing pick side portion, where the pick side portion includes a pick side lock, where the load side portion includes a load side lock, and where at least one of the pick side lock and the load side lock are recessed within the channel as a result of the bias of the double lock.

16 Claims, 9 Drawing Sheets

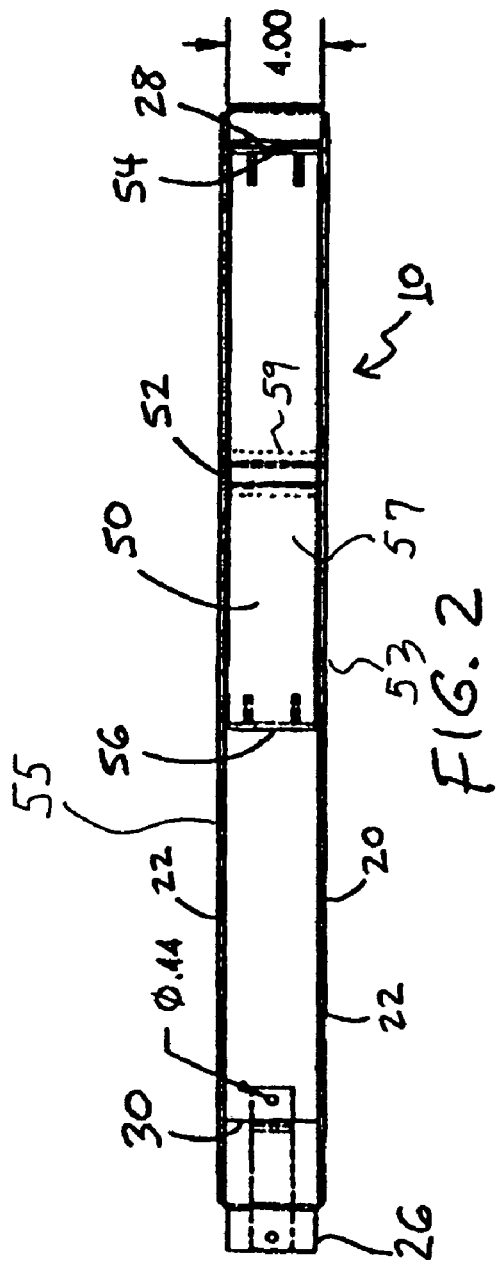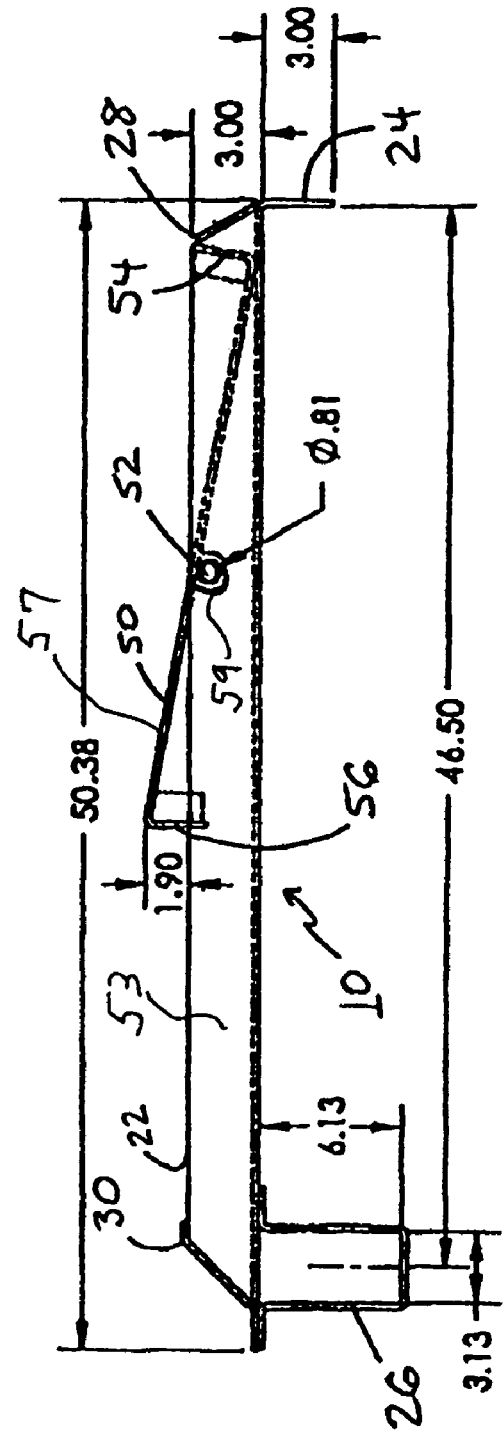

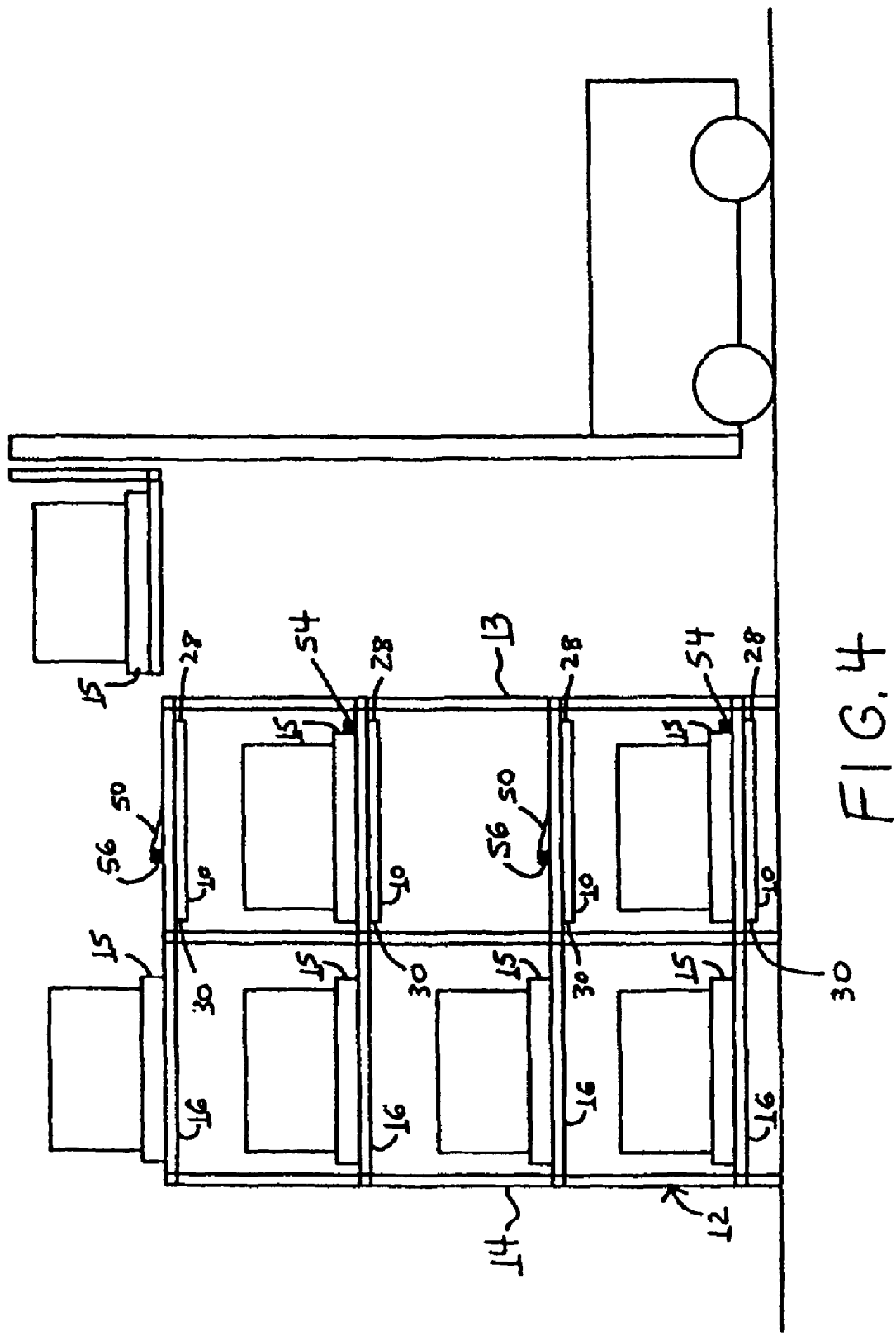

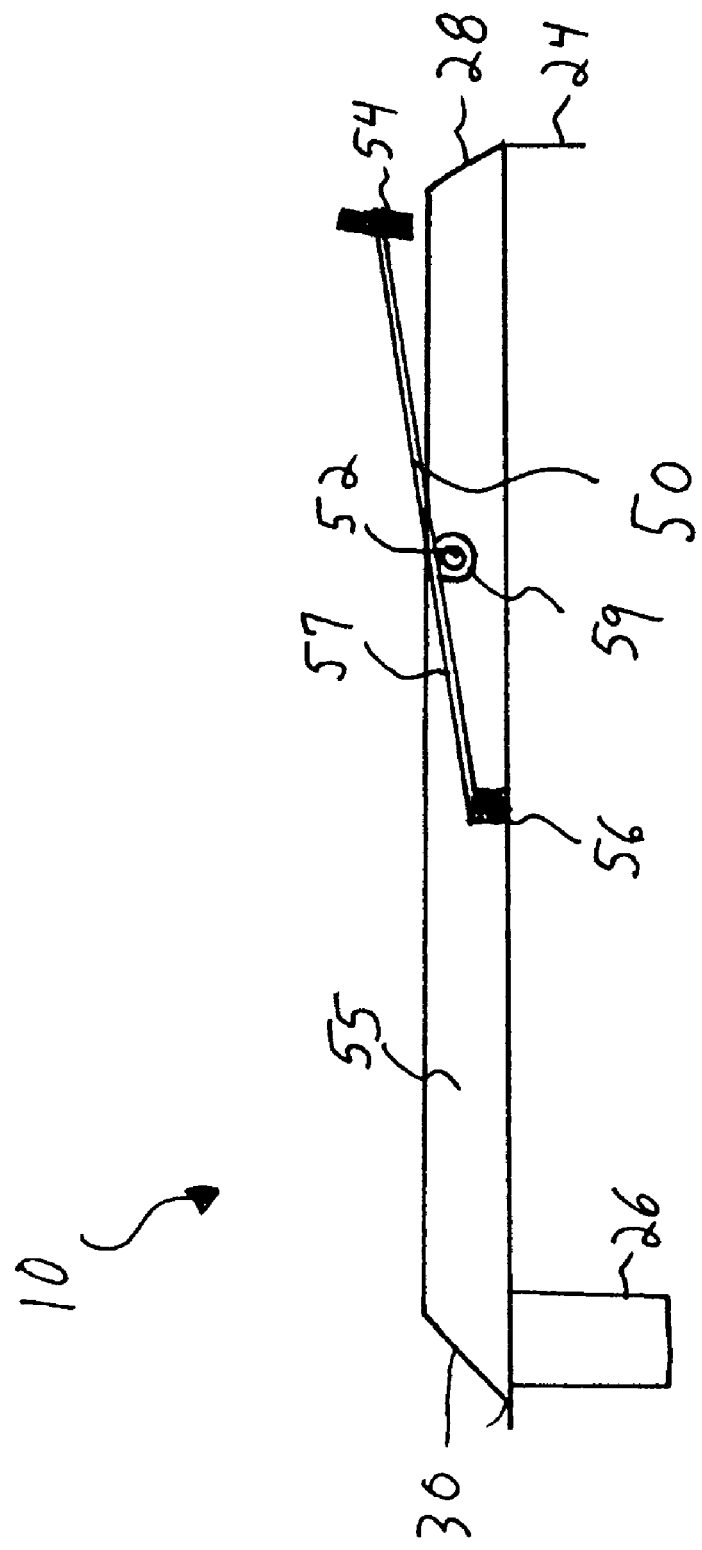

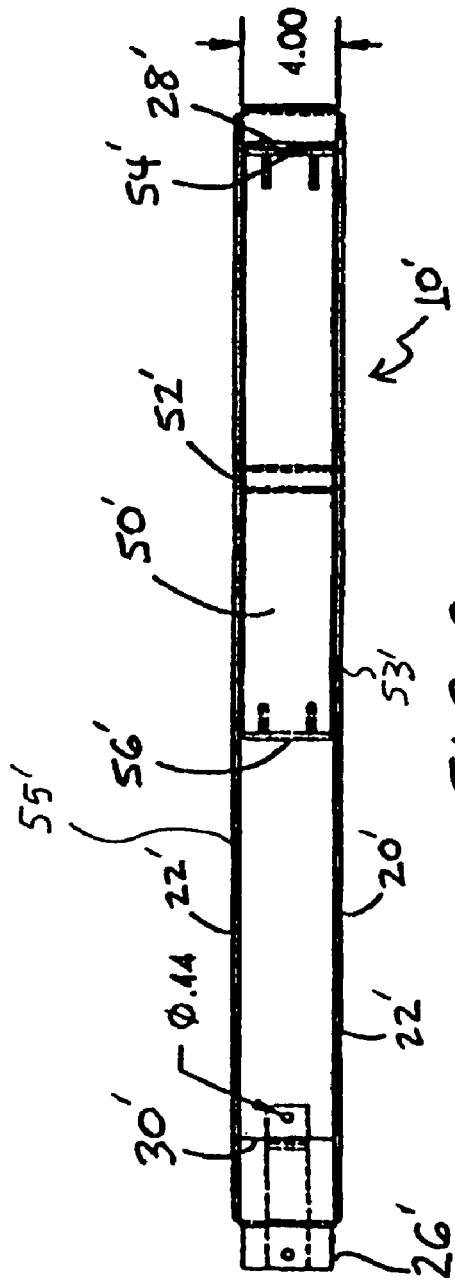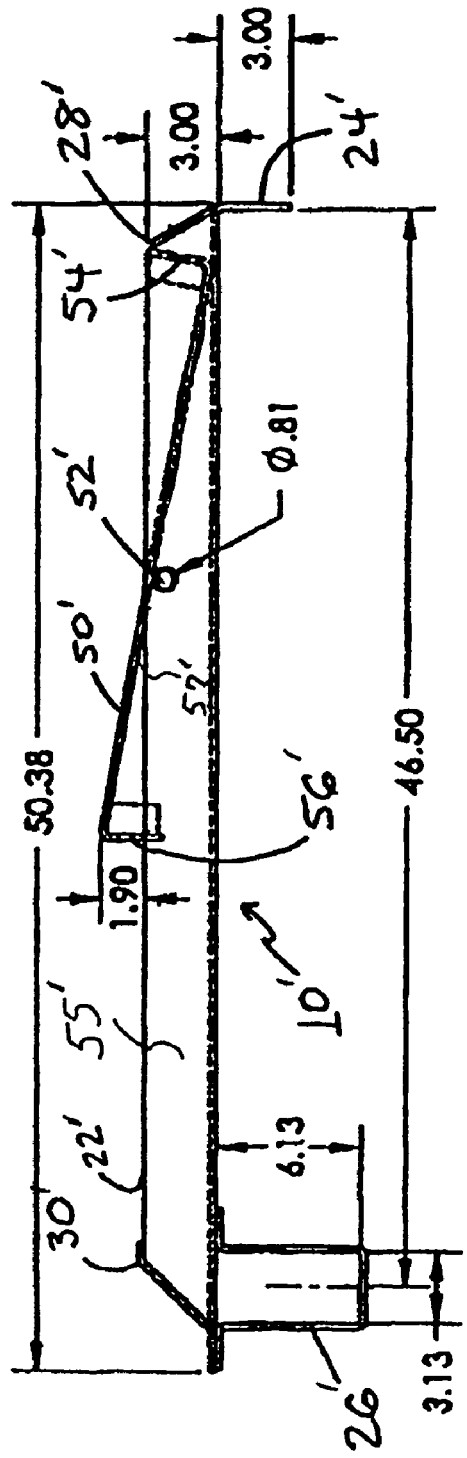

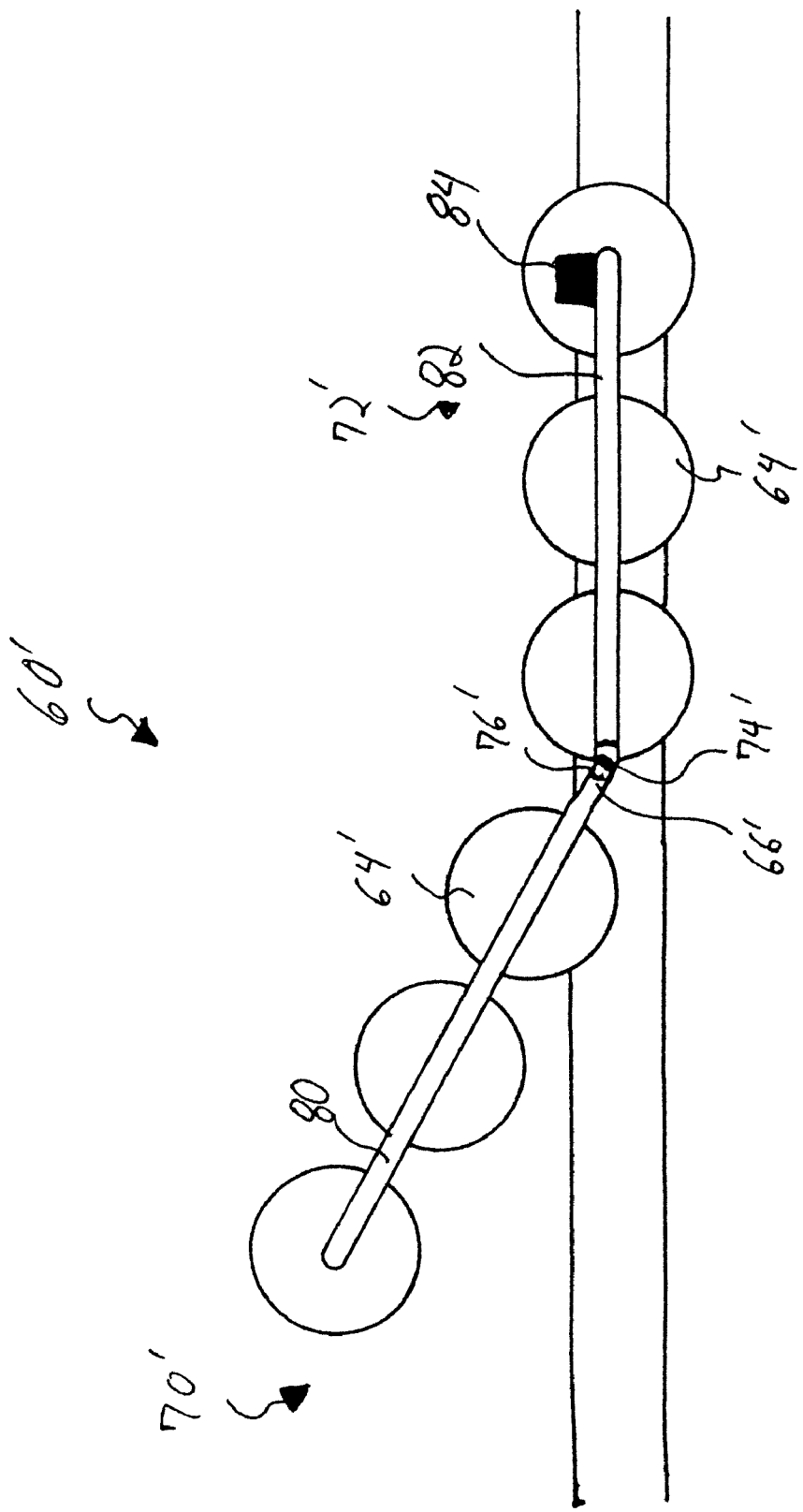

PALLET LOCKS

CROSS-REFERENCE TO RELATED APPLICATIONS

This application is a claims priority under 35 U.S.C. §§119, 120 to U.S. Provisional Patent Application Ser. No. 60/836,528 filed on Aug. 9, 2006, entitled "PALLET LOCKS," the disclosure of which is hereby incorporated by reference.

RELATED ART

Field of the Invention

The present invention is directed to devices and methods of controlling egress of bulk goods and, more specifically, to devices and methods of controlling the egress of pallets.

INTRODUCTION TO THE INVENTION

It is a first aspect of the present invention to provide a pallet lock comprising: (a) a housing including two opposing rails defining a channel therebetween; and (b) a biased double lock at least partially seated within the channel, the double lock repositionable between a pick side blocking position and a load side blocking position, the double lock including a load side portion and an opposing pick side portion, wherein the pick side portion includes a pick side lock, wherein the load side portion includes a load side lock, and wherein at least one of the pick side lock and the load side lock are recessed within the channel as a result of the bias of the double lock.

In a more detailed embodiment of the first aspect, the two opposing rails are longitudinally in parallel to one another. In yet another more detailed embodiment, the double lock includes a pivot pin rotationally repositionable with respect to the housing, thereby rendering the double lock rotationally repositionable with respect to the housing. In a further detailed embodiment, a center of balance of the double lock is offset from the pivot pin. In still a further detailed embodiment, the double lock is always in either the pick side blocking position of the load side blocking position. In a more detailed embodiment, the double lock is biased by a spring to the pick side blocking position. In a more detailed embodiment, the double lock includes conveyor wheels. In another more detailed embodiment, the double lock includes a segment that is generally Z-shaped, a first section of the Z-shaped segment comprises the load side portion, and a second section of the Z-shaped segment, generally opposite that of the first section, comprises the pick side portion.

It is a second aspect of the present invention to provide a pallet lock comprising: (a) a housing including two opposing rails defining a channel therebetween, where the housing includes a spindle; and (b) a floating spring ramp having a first portion mounted to the housing and recessed within the channel, and a second portion, generally opposite the first portion, vertically repositionable with respect to the channel between a blocking position where a majority of the second portion is not seated within the channel and an egress position where the majority of the second portion is seated within the channel, where the floating spring ramp under loaded conditions contacts the spindle and bends at least partially around the spindle to arrive at the egress position.

In a more detailed embodiment of the second aspect, the two opposing rails are longitudinally in parallel to one another. In yet another more detailed embodiment, the spindle is mounted to at least one of the two opposing rails. In a further detailed embodiment, the floating spring ramp is biased to the blocking position. In still a further detailed embodiment, the floating spring ramp includes conveyor wheels. In a more detailed embodiment, the two opposing rails each include dorsal skis.

It is a third aspect of the present invention to provide a unidirectional conveyor rail segment comprising a conveyor rail segment including a wheeled section comprising at least one of a floating wheeled section or a pivoting wheeled section, where the wheeled section includes a repositionable barrier, biased to a barrier position, to inhibit transport of articles in a first direction beyond the conveyor rail segment, but allow transport of articles in a second direction, generally opposite the first direction.

In a more detailed embodiment of the third aspect, the wheeled section comprises a floating wheeled section. In yet another more detailed embodiment, the wheeled section comprises a pivoting wheeled section. In a further detailed embodiment, the pivoting wheeled section includes a V-shaped portion that includes a first leg angled with respect to a second leg, the first leg includes at least one wheel, and the second leg includes a barrier.

BRIEF DESCRIPTION OF THE DRAWINGS

FIG. 2 is a plan view of the first exemplary embodiment of FIG. 1;

FIG. 3 is a left side profile view of the first exemplary embodiment of FIG. 1;

FIG. 4 is a frontal view of an exemplary pallet flow rack 12 incorporating the first exemplary embodiment of FIG. 1;

FIG. 5 is left side profile view, without the left side rail, of the first exemplary embodiment of FIG. 1, shown in a load end blocking position;

FIG. 6 is a plan view of a first alternate exemplary embodiment, shown in the pick end blocking position;

FIG. 7 is a left side profile view of the first alternate exemplary embodiment of FIG. 6;

FIG. 11 is a left side profile view of a second alternate exemplary embodiment, without the left side rail, shown in the pick end blocking position.

DETAILED DESCRIPTION

Figure 1:
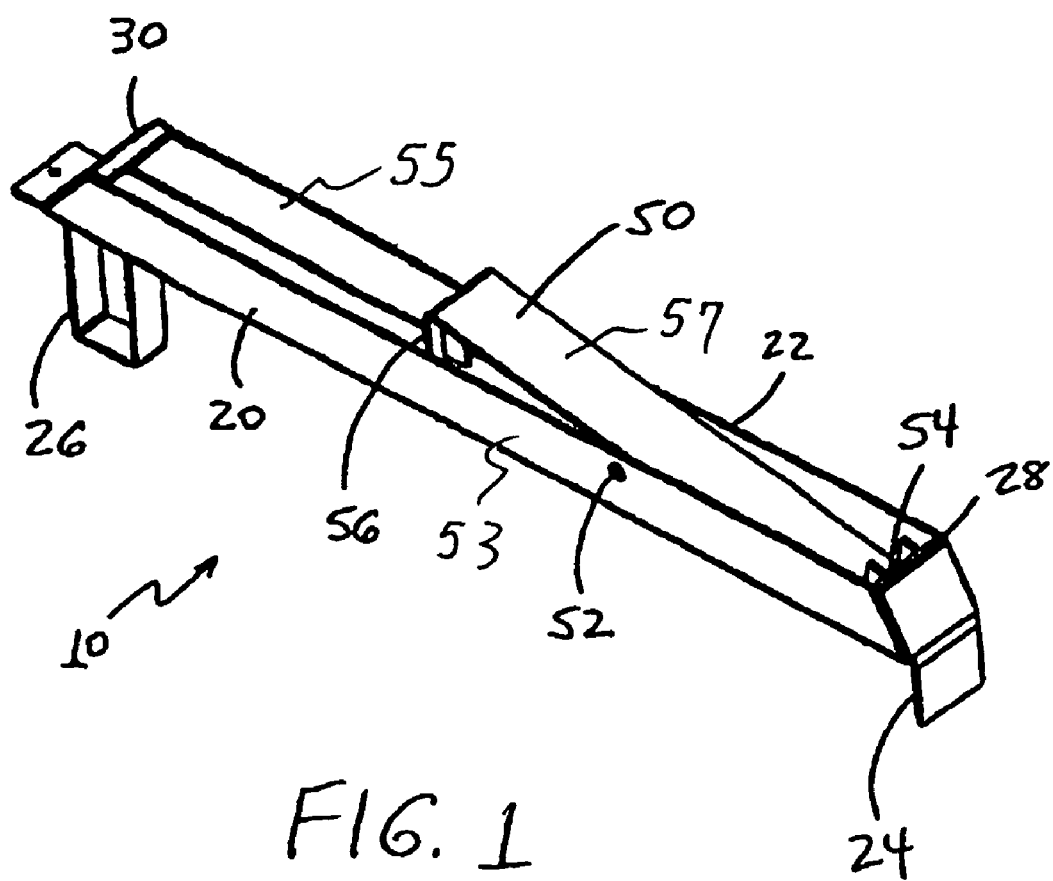
FIG. 1 is an elevated perspective view of a first exemplary embodiment in accordance with the present invention, where the embodiment is shown in a pick end blocking position.

The exemplary embodiments of the present invention are described and illustrated below to encompass devices and associated methods for conveying and inhibiting travel of palletized, boxed, containerized, and bulk goods in a predetermined direction. Of course, it will be apparent to those of ordinary skill in the art that the preferred embodiments discussed below are exemplary in nature and may be reconfigured without departing from the scope and spirit of the present invention. However, for clarity and precision, the exemplary embodiments as discussed below may include optional steps, methods, and features that one of ordinary skill should recognize as not being a requisite to fall within the scope of the present invention.

Referencing FIGS. 1-5, an exemplary pallet lock 10 comprises a channel 20 in which a lock member 50 is pivotally mounted. This pallet lock 10 can be affixed to a conventional pallet flow rack 12 (see FIG. 4), a conveyor, or another device used to transport or store palletized, boxed, containerized, or otherwise discrete loads. The channel 20 has an load end 28 and a pick end 30. When the pallet lock 10 is fixed to a pallet flow rack 12, it can be attached to the frame of the rack 12 adjacent to the conveyor rollers so that the lock member 50 extends above the upper surface of the rollers as will be described in greater detail below. In exemplary form, the load end 28 of the pallet lock 10 may be located and oriented proximate to a load end 13 of the pallet flow rack 12. The pallet lock 10 is generally oriented so that the normal direction of pallet 15 flow is from the load end 28 to the pick end 30. Nevertheless, it is also within the scope of the invention to attach one or more pallet locks 10 at locations other than that of the load end 13 of a pallet flow rack 12. For example, the pallet lock 10 may be attached at any point along a pallet flow rack 12, a conveyor, or another device used transport or store palletized, boxed, containerized, or otherwise discrete loads.

Referring to FIG. 2, the channel 20 of the pallet lock 10 is generally rectangular in cross-section, where the cross-sections are parallel to a horizontal plane. The lock member 50 is mounted to a dowel 52 piercing each of the opposed rails 53, 55, where the dowel 52 extends from one side of the channel 20 to the opposing side and is rotationally repositionable with respect to the side rails 53, 55 partially defining the channel 20. In this manner, the dowel 52 establishes a rotational axis for the lock member 50. Moreover, the center of balance of the lock member 50 may be offset from the location where the lock member is mounted to the dowel 52.

Referencing FIG. 3, the lock member 50 is generally Z-shaped. The lock member 50 has two opposing ends comprising a load end 54 and a pick end 56. The dowel 52, which the lock member 50 is mounted to, is mounted to the rails 53, 55 near the upper edge 22 of channel 20 to enable rotational repositioning of the lock member 50 in a multitude of angular positions. In this exemplary embodiment, the upper edge 22 is operative to provide a ski along which a pallet may slide. Turning back to the angular positions, these angular positions of the lock member 50 include one end 54/56 or a portion of both ends 54/56 of the lock member 50 extending above the upper or dorsal edge 22 of the channel 20 and rails 53, 55. In this exemplary embodiment, the lock member 50 is biased by a torsion spring 59 circumscribing the dowel 52, but the lock member may also be biased by gravity, or both a spring force and gravity so that the load end 54 pivots downward into the channel 20 and the pick end 56 pivots upward and out of the channel 20 when no pallet 15 is present (i.e., an unloaded position).

Referring to FIG. 4, an exemplary pallet flow rack 12 includes a pallet lock 10 interfacing with pallets 15 on each of the four levels of the pallet flow rack. The pallet flow rack 12 has a load end 13 and a pick end 14 and includes rollers (such as conveyor tracks, not shown) affixed to the horizontal members 16. Initially, the pallet lock 10 is biased into the unloaded position (see the second and fourth levels of the pallet flow rack of FIG. 4), but as pallets are loaded within the respective levels, this position changes to a loaded position. When loading operations commence, each pallet 15 travels along the conveyor of the pallet flow rack 12 in the forward direction (in the direction from the load end 13 to the pick end 14), its leading edge depresses the upwardly extended slanted portion 57 of the lock member 50 adjacent to the pick end 56 of the lock 10. This applied force of the pallet causes the lock member 50 to pivot about the rotational axis established by the dowel 52 so that the pick end 56 moves downward and into the channel 20, while the load end 54 of the lock member 50 moves upward and out of the channel 20. When rotated upward, the load end 54 of the lock member 50 prevents a pallet 15 from traveling backwards (in the direction from pick end 13 to load end 14) on the pallet flow rack 12 (see the first and third levels of the pallet flow rack of FIG. 4). This position is commonly referred to as the loaded position (see FIG. 5).

As further the pallets 15 are loaded, the pallet closest to the load side 13 travels along the conveyor and its trailing edge eventually passes beyond the pick end 56 of the pallet lock 10. At this point, the pallet lock 10 returns to its initial unloaded position with the pick end 56 raised out of the channel 20 and the load end 54 recessed within the channel 20 due to the biasing discussed above. In this unloaded position, the pick end 56 prevents a pallet 15 from traveling backwards (in the direction from pick end 14 to load end 13) on the pallet flow rack 12.

The exemplary pallet lock 10 may be constructed primarily of steel. It is within the scope of the invention to utilize other materials for constructing the pallet lock 10 including, but not limited to, plastics, composites, fibers, ceramics, rubber, or wood. In addition, it is within the scope of the invention to include components such as bumpers, wear surfaces, and fasteners composed of other materials.

The pallet lock 10 may be attached to a pallet flow rack 12, a conveyor, or another device used to transport or store palletized, boxed, containerized, or otherwise discrete loads using methods such as, but not limited to, fasteners, such as screws, bolts, or clips, or welded joints.

All dimensions shown on the drawings are exemplary in nature. Thus, dimensions may vary from those shown in the figures without departing from the scope of the invention. Additionally, although the above description of the operation of the invention includes pallets 15, it is within the scope of the invention to use the pallet lock 10 as described with any palletized, boxed, containerized, or otherwise discrete loads.

Figure 8:
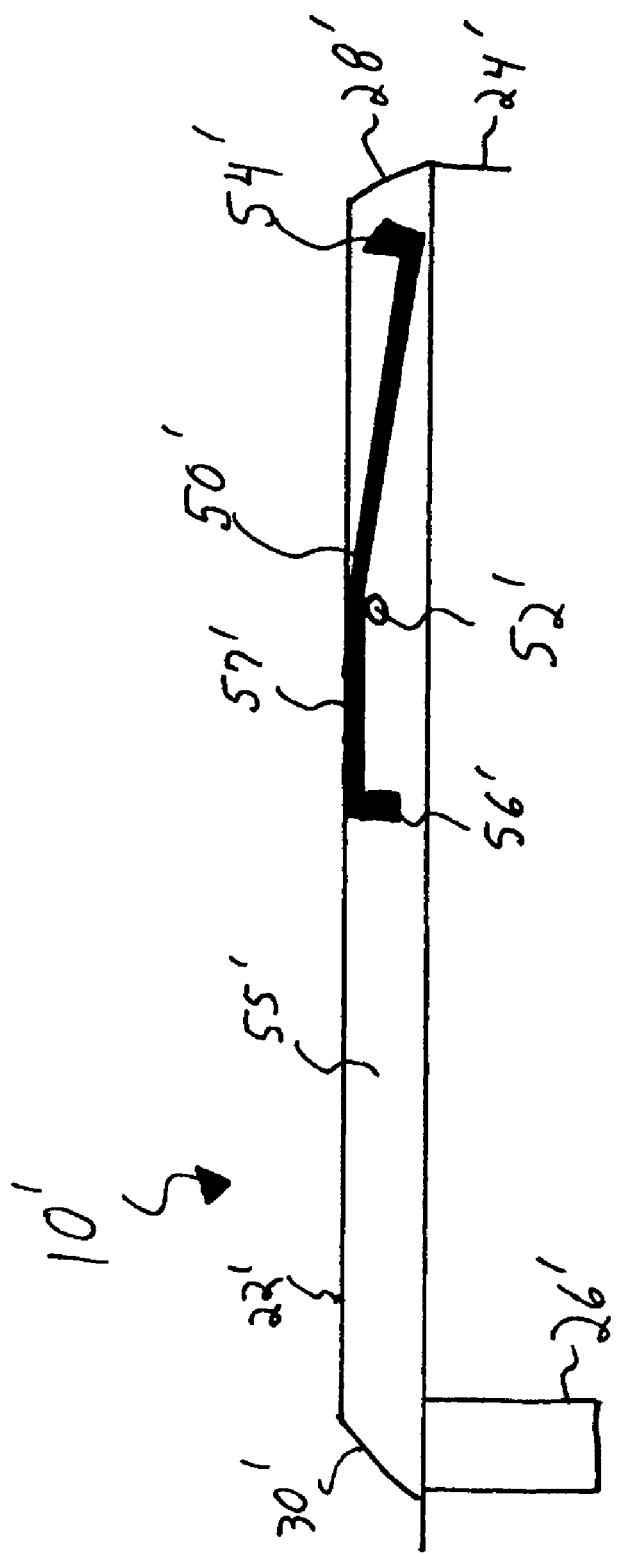
FIG. 8 is left side profile view, without the left side rail, of the first alternate exemplary embodiment of FIG. 6, pick end egress position.

Referencing FIGS. 6-8, a first alternate exemplary pallet lock 10' includes a lock member 50' and dowel 52' that are not fastened together. In this exemplary embodiment, the load end 54' of the lock member 50' is permanently mounted within the channel 20', while the pick end 56' is able to traverse up and down with respect to the channel 20'. In this exemplary embodiment, the load end 54' is welded to the opposing rails 53', 55'.

As with the first exemplary embodiment, the pallet lock 10' is generally rectangular in cross-section, where the cross-sections are parallel to a horizontal plane. However, in this exemplary embodiment, the lock member 50' floats above the dowel 52' and is operative to contact the dowel 52' and at least partially deform around the dowel 52' when under a load. In this manner, the lock member 50' itself provides the spring force to deform under loads and return to an upright position out of the channel under unloaded conditions.

In operation of this alternate exemplary embodiment, pallets (not shown) are loaded onto the pallet rack (not shown) in the forward direction (in the direction from the load end to the pick end) and are operative to contact the upwardly extended slanted portion 57' of the lock member 50' adjacent to the pick end 56'. In this alternate exemplary embodiment, the lock member 50' is forced against the dowel 52' and deforms under the contact pressure from the pallet 15. This deformation causes the pick end 56' down and into the channel 20', thereby allowing passage of the pallet 15 (which may or may not be riding upon the rails 53, 55). When the pallet 15 passes the pick end 56, the spring force of the lock member 50 is operative to reposition the lock member to an upright position (i.e., an unloaded position), thereby blocking pallets from traveling in a rearward direction (in the direction from the pick end 14 to the load end 13).

Figure 9:
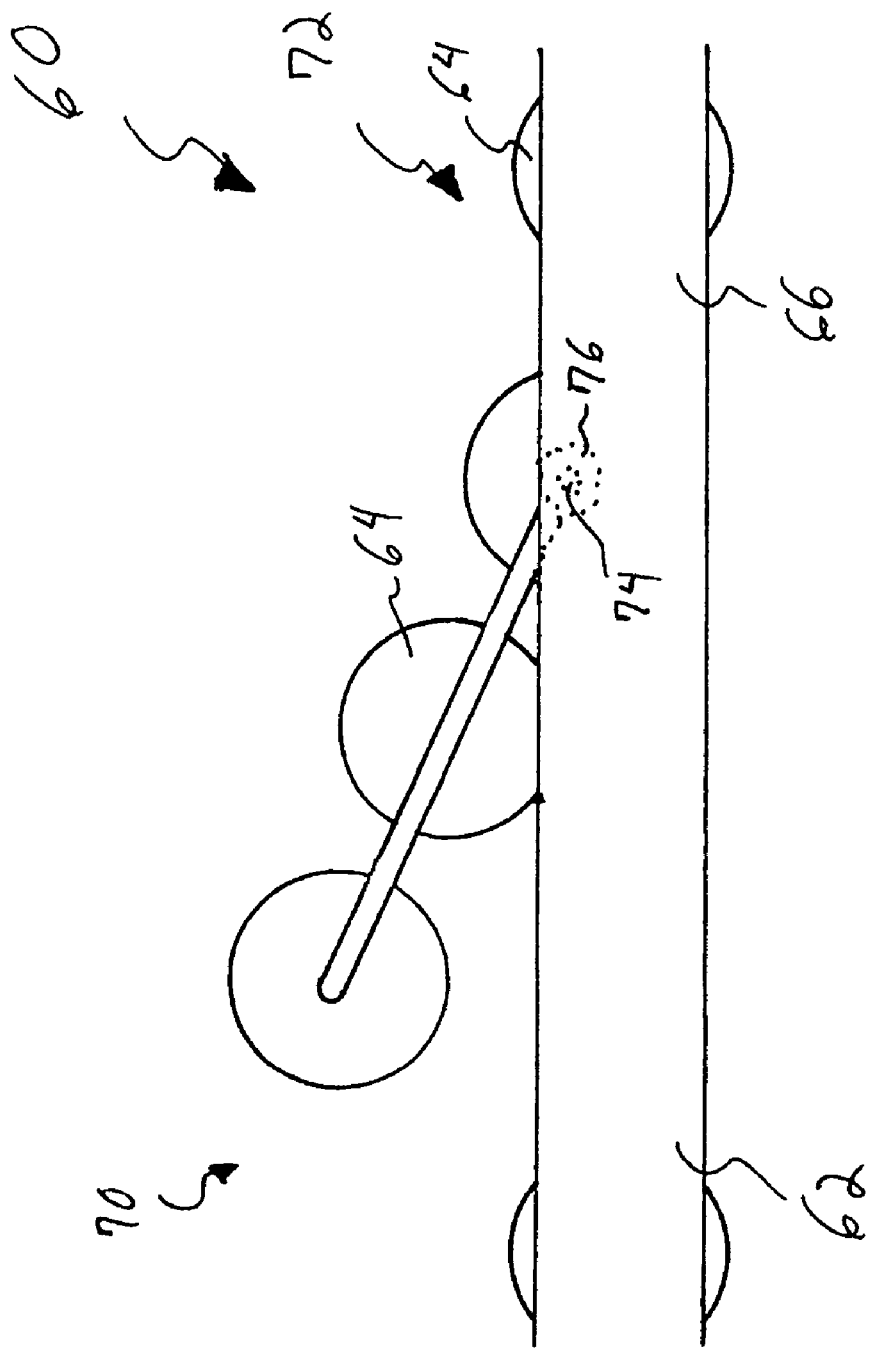
FIG. 9 is a left side profile view of a second exemplary embodiment, shown in the pick end blocking position.
Figure 10:
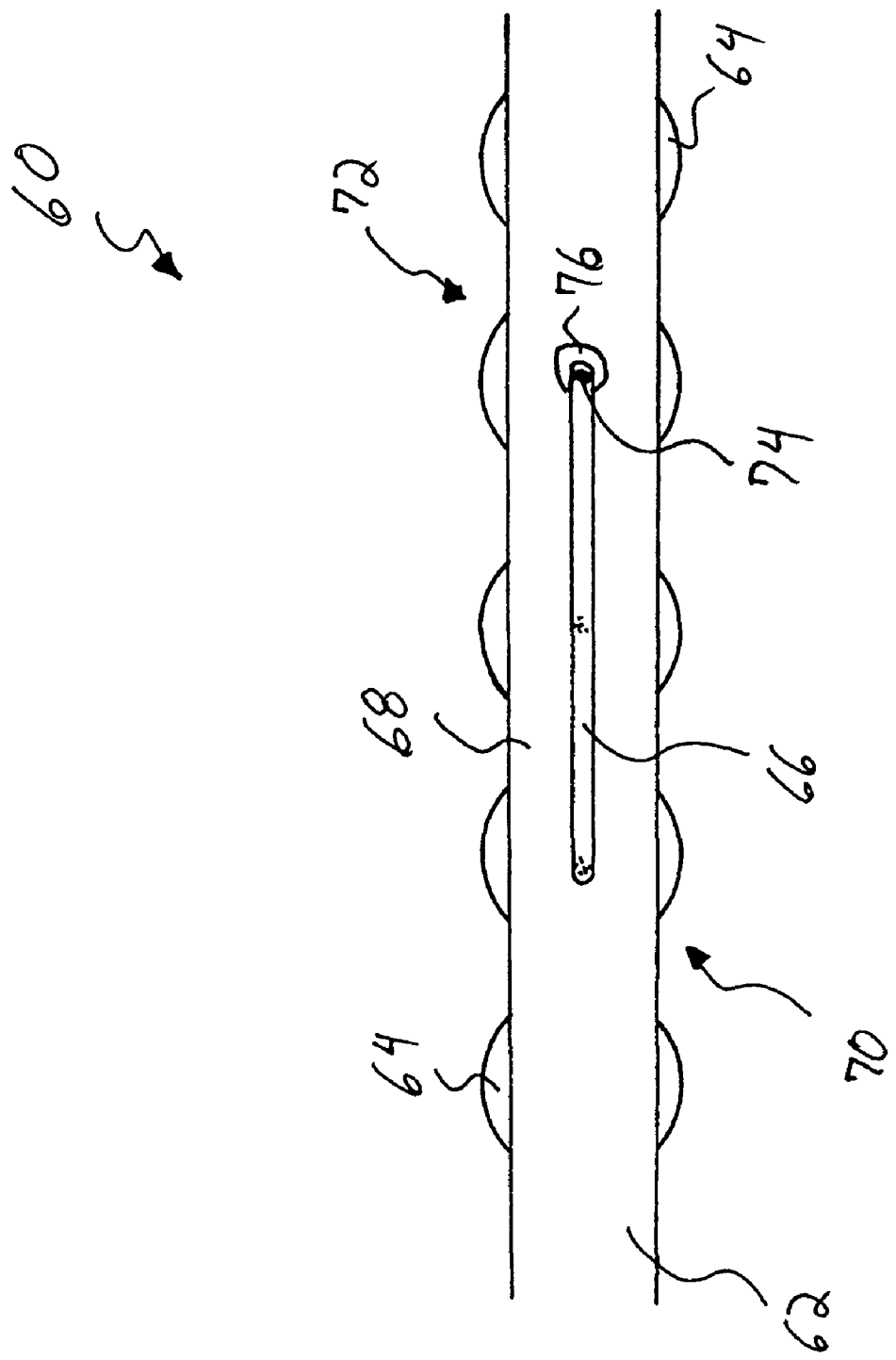
FIG. 10 is a left side profile view of a second exemplary embodiment, without the left side rail, shown in the egress position.

Referring to FIGS. 9-11, a second alternate exemplary pallet lock 60 is integrated into a pallet conveyor 62 In exemplary form, the pallet lock 60 comprises a section of a pallet conveyor 62 and includes a plurality of wheels 64 for transporting palletized, boxed, containerized, or otherwise discrete loads. Similar to the first exemplary embodiment (see FIGS. 1-5), a lock member 66 is pivotally mounted with respect to a pair of longitudinal rails 68, but biased to an unloaded position (see FIG. 9) so that a pick end 70 includes a barrier to inhibit pallets (not shown) from passing from left to right beyond the pick end and the load end 72 when exposed to an unloaded condition. Conversely, the load end 72 of the lock member includes inclined wheel assembly to allow pallets to move from right to left. In this exemplary embodiment, the lock member 66 is biased to the blocking position of FIG. 9 by way of a torsion spring 76 circumscribing an axial pin 74 about which the lock member pivots.

In operation of this second alternate exemplary pallet lock 60, pallets are loaded onto a conveyor in the forward direction (in the direction from the load end 72 to the pick end 70) and are operative to contact the inclined wheel assembly of the lock member 66 adjacent to the load end 72. In this second alternate exemplary embodiment, the lock member 66 pivots about the axial pin 74 so that the pick end 70. The wheels 64 are operative as a ramp to allow portions of the pallet to ride over the load side, while inhibiting the pallet from traveling from left to right after the pallet has passed the pick side 70 (see FIG. 9). When in the loaded position (see FIG. 10), the lock member 66 is depressed into a channel between the pair of longitudinal rails 68, thereby negating the pick side barrier.

Alternatively, as shown in FIG. 11, the second alternate exemplary pallet lock 60' may be fabricated similar to the first alternate exemplary embodiment, but in this instance the lock member 66' is a V-shaped pivoting member having a wheel assembly at one leg 80 of the V, while the other leg 82 of the V includes a block 84 to inhibit travel of pallets from left to right. In this exemplary embodiment, an axial pin 74' is circumscribed by a torsion spring 76' to bias the lock member 66' in a pick side blocking position (see FIG. 11). However, the bias of the torsion spring may be overcome by the weight of the pallet and/or the items mounted on the pallet to pivot the lock member 66' into a load side blocking position where the wheel assembly of the first let 80 would be substantially level with the remaining wheels of the conveyor, while the second leg 82 would project upward from the conveyors (and conveyor rails) at an angle to expose the block 84 and inhibit travel of pallets from the pick side 70' to the load side 72'.

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A pallet lock comprising:
 a housing including two opposing rails defining a channel therebetween; and
 a biased double lock including a ski at least partially seated within the channel and extending above the channel, the double lock repositionable between a pick side blocking position and a load side blocking position, the double lock including a load side portion and an opposing pick side portion, wherein the pick side portion includes a pick side lock having a pick side panel acutely angled with respect to the ski, where the pick side panel has a vertical dimension approximating a vertical dimension of the channel, wherein the load side portion includes a load side lock having a load side panel acutely angled with respect to the ski, where the load side panel has a vertical dimension approximating a vertical dimension of the channel, wherein the pick side panel is oriented generally in parallel to the load side panel, and wherein at least one of the pick side lock and the load side lock are recessed within the channel as a result of the bias of the double lock.

2. The pallet lock of claim 1, wherein the two opposing rails are longitudinally in parallel to one another.

3. The pallet lock of claim 1, wherein the double lock includes a pivot pin rotationally repositionable with respect to the housing, thereby rendering the double lock rotationally repositionable with respect to the housing.

4. The pallet lock of claim 1, wherein a center of balance of the double lock is offset from the pivot pin.

5. The pallet lock of claim 4, wherein the double lock is always in either the pick side blocking position of the load side blocking position.

6. The pallet lock of claim 1, wherein the double lock is biased by a spring to the pick side blocking position.

7. The pallet lock of claim 1, wherein the double lock includes conveyor wheels.

8. The pallet lock of claim 1, wherein:
 the double lock includes a segment that is generally Z-shaped;
 a first section of the Z-shaped segment comprises the load side portion; and
 a second section of the Z-shaped segment, generally opposite that of the first section, comprises the pick side portion.

9. A pallet lock comprising:
 a housing including two opposing rails defining a channel therebetween, where the housing includes a spindle; and
 a floating spring ramp having a first portion mounted to the housing and recessed within the channel, and a second portion, generally opposite the first portion, vertically repositionable with respect to the channel between a blocking position where a majority of the second portion is not seated within the channel and an egress position where the majority of the second portion is seated within the channel, where the floating spring ramp under loaded conditions contacts the spindle and bends at least partially around the spindle to arrive at the egress position.

10. The pallet lock of claim 9, wherein the two opposing rails are longitudinally in parallel to one another.

11. The pallet lock of claim 9, wherein the spindle is mounted to at least one of the two opposing rails.

12. The pallet lock of claim 9, wherein the floating spring ramp is biased to the blocking position.

13. The pallet lock of claim 9, wherein the floating spring ramp includes conveyor wheels.

14. The pallet lock of claim 9, wherein the two opposing rails each include dorsal skis.

15. A unidirectional conveyor rail segment comprising:

a conveyor rail segment comprising at least two spaced apart conveyor rails and a plurality of wheels positioned between the at least two spaced apart conveyor rails, the conveyor rail segment also including a pivoting wheeled section that includes a repositionable harrier, biased to a barrier position, to inhibit transport of articles in a first direction beyond the conveyor rail segment, but allow transport of articles in a second direction, generally opposite the first direction, wherein the repositionable harrier includes a repositionable wheel extending above the plurality of wheels of the conveyor rail segment at least to a height equal to a diameter of the repositionable wheel or a diameter of one of the plurality of wheels.

16. The unidirectional conveyor rail segment of claim 15, wherein
the pivoting wheeled section includes a V-shaped portion that includes a first leg angled with respect to a second leg;
the first leg includes at least one wheel; and
the second leg includes a barrier.

* * * * *